(12) United States Patent
Nielsen et al.

(10) Patent No.: US 12,319,436 B1
(45) Date of Patent: Jun. 3, 2025

(54) AIRCRAFT FUSELAGE LIGHTING POD

(71) Applicants: Christian R Nielsen, Palm Coast, FL (US); Olexandr Shepelyuk, Gelnica (SK); Oleksii Antoshyn, Píbram VII (CZ); Anton Bondariev, Dobris (CZ); Javier Gordillo Perera, Pribram (CZ); Oleksandr Golodnik, Gelnica (SK)

(72) Inventors: Christian R Nielsen, Palm Coast, FL (US); Olexandr Shepelyuk, Gelnica (SK); Oleksii Antoshyn, Píbram VII (CZ); Anton Bondariev, Dobris (CZ); Javier Gordillo Perera, Pribram (CZ); Oleksandr Golodnik, Gelnica (SK)

( * ) Notice: Subject to any disclaimer, the term of this patent is extended or adjusted under 35 U.S.C. 154(b) by 0 days.

(21) Appl. No.: 18/940,780

(22) Filed: Nov. 7, 2024

(51) Int. Cl.
*B64D 47/02* (2006.01)
*B64C 27/04* (2006.01)

(52) U.S. Cl.
CPC .............. *B64D 47/02* (2013.01); *B64C 27/04* (2013.01)

(58) Field of Classification Search
CPC ........ B64D 47/02; B64D 47/04; B64D 47/06; B64D 2203/00; F21W 2107/30
See application file for complete search history.

(56) References Cited

U.S. PATENT DOCUMENTS

| | | | | |
|---|---|---|---|---|
| 5,567,036 | A * | 10/1996 | Theobald | F21V 5/04 362/800 |
| 6,431,728 | B1 * | 8/2002 | Fredericks | B60Q 1/2696 362/240 |
| D1,055,335 | S * | 12/2024 | Nielsen | D26/28 |
| 2004/0130900 | A1 * | 7/2004 | Ganzer | B64D 47/06 362/470 |
| 2005/0128759 | A1 * | 6/2005 | Fredericks | B64D 47/06 362/470 |
| 2011/0261577 | A1 * | 10/2011 | Kohlmeier-Beckmann | F21S 43/14 362/545 |
| 2015/0285462 | A1 * | 10/2015 | Shimoda | B60Q 1/2696 362/218 |
| 2016/0280396 | A1 * | 9/2016 | Schoen | B64D 47/06 |
| 2018/0363876 | A1 * | 12/2018 | Gerardo | B60Q 1/2696 |
| 2021/0009284 | A1 * | 1/2021 | Jha | B64U 30/20 |
| 2021/0047051 | A1 * | 2/2021 | Hessling-Von Heimendahl | H05B 47/16 |
| 2021/0276730 | A1 * | 9/2021 | Jha | B64D 47/06 |
| 2023/0151943 | A1 * | 5/2023 | Jha | B64D 47/06 362/470 |

FOREIGN PATENT DOCUMENTS

DE 202010002772 U1 * 8/2010 .............. B60Q 1/32

* cited by examiner

*Primary Examiner* — Alexander K Garlen
(74) *Attorney, Agent, or Firm* — Barry Choobin; Patent 360

(57) ABSTRACT

A lighting pod for an aircraft, such as a helicopter. The lighting pod includes aerodynamic housing in which multiple lights are mounted in optimum positions providing efficient lighting and lesser air drag. The lighting pod includes taxi lights, landing lights, scene lights, rear lights, hover lights, hoist lights, and headlights. The lighting pod having all the essential lights can be easily installed and removed from an aircraft.

11 Claims, 13 Drawing Sheets

# AIRCRAFT FUSELAGE LIGHTING POD

CROSS-REFERENCE TO RELATED APPLICATIONS

Field of Invention

The present invention relates to an aircraft fuselage lighting pod, and more particularly, the present invention relates to a fuselage lighting pod for electric vertical take-off and landing (eVTOL) vehicles, Helicopters, and unmanned aerial vehicle (UAV).

BACKGROUND

Aircraft have a variety of external lights for multiple purposes, the primary purpose is illumination. External lights are used to make an aircraft visible to others. Also, like automobiles, lights are used to illuminate the path of the aircraft. External lights are also used to indicate the operational status of an aircraft. Depending on their intended purpose, the lights are deployed all over an aircraft's airframe. In aircraft, such as helicopters, UAVs (drones), eVTOL, and slow-flying search and rescue fixed-wing aircraft, different lights, such as scene lights, hoist lights, hover lights, taxi and landing lights, searchlights, ground illumination, rotor safety illumination lights, and like are used. All these lights are essential, however, the use of multiple lights and the long wiring paths connecting these lights adds significant weight to the aircraft, which is undesirable for flying. Another drawback with these lights is the complex and laborious installation.

A need is therefore appreciated for a lighting system that can overcome the drawbacks of conventional external lighting in aircraft.

The term aircraft herein include helicopters, UAVs (drones), eVTOL, slow-flying search and rescue fixed-wing aircraft, and the like.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a multifunction lighting pod for aircraft.

Another object of the present invention is to eliminate complicated and heavy wiring throughout the airframe.

Still, another object of the present invention is that the lighting pod can be positioned close to the avionic bay of an aircraft.

Yet another object of the present invention is to control the lighting pod with cockpit switches.

A further object of the present invention is to control the lighting pod wirelessly.

In one aspect, disclosed is a lighting pod for an aircraft comprising a housing having a front, a rear, a left, a right, a top, and a bottom, wherein the bottom of the housing faces the aircraft when the lighting pod is mounted to the aircraft, the front has a nose formed by two diagonal flat sides and a head above the nose, the left has two diagonal sides, and the right has two diagonal sides; a vibration proof and G-force absorbing coupling bracket mounted to a base plate of the housing, the base plate is at the bottom, and the coupling bracket is configured to mount the lighting pod to the aircraft; and an electrical interface configured for connecting the lighting pod to electronics of the aircraft.

In one aspect, the aircraft is a helicopter, and the lighting pod is configured to mount over a belly of the helicopter. The two taxi lights are mounted to the two diagonal flat sides of the nose. A landing light is mounted to the head. Four scene lights are mounted to the two diagonal sides of the left of the housing, two scene lights one above another on each of the two diagonal sides of the left of the housing. Four scene lights are mounted to the two diagonal sides of the right of the housing, two scene lights one above another on each of the two diagonal sides of the right of the housing. A rear light is mounted on the rear of the housing. The top of the housing has a front-end portion, a rear-end portion, and a middle portion, the middle portion has a hole. A hover light is mounted on the front-end portion of the top of the housing. A hoist light is mounted on the rear-end portion of the top of the housing. A headlight is mounted on the middle portion covering the hole, wherein the headlight is configured to pivot between a retracted state and an extended state.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
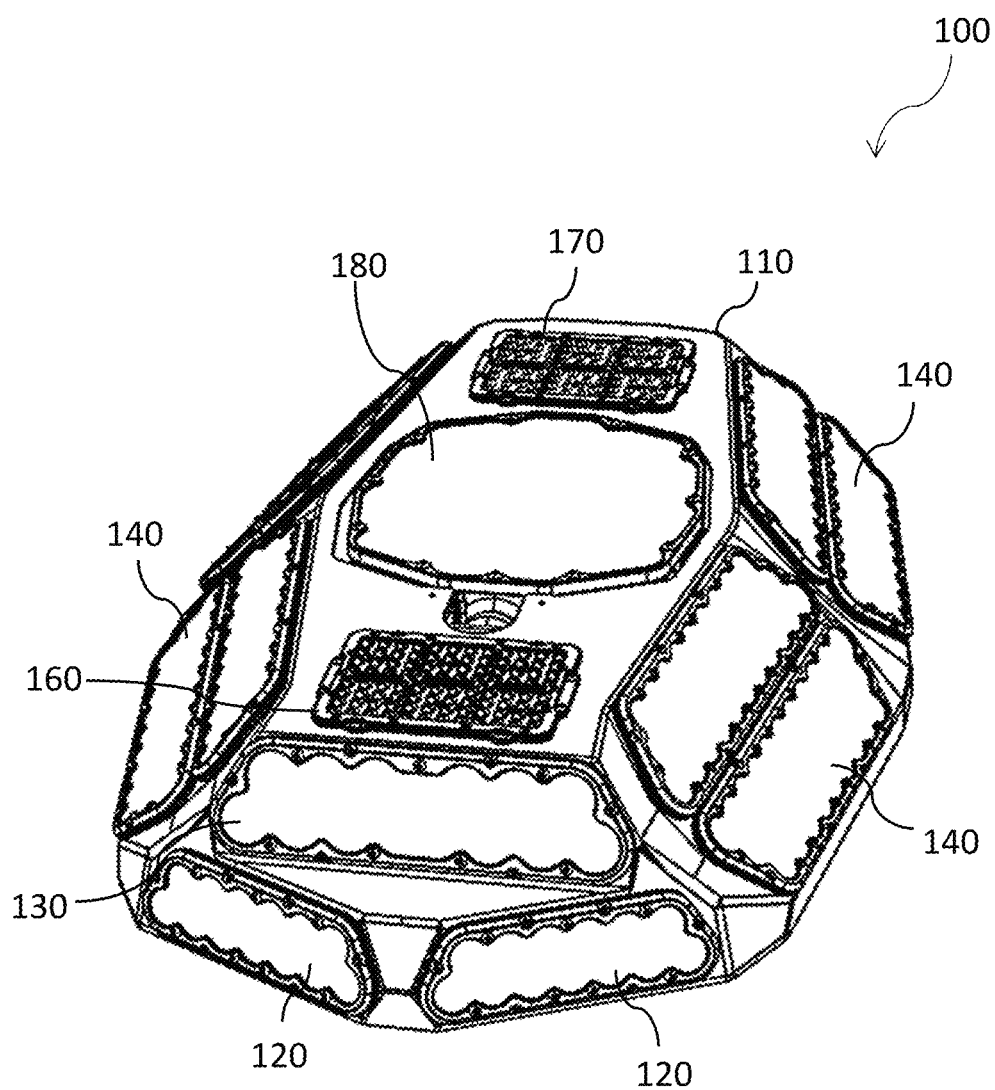
FIG. 1 shows a perspective view of a lighting pod for an aircraft, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the allowed claims of any resulting patent will best define the scope of the invention.

REFERENCE NUMERALS

100: Lighting pod
110: Housing
120: Taxi lights
130: Landing light
140: Scene light
150: Rear light
160: Hover light
170: Hoist light
180: Headlight
210: Base plate
220: Bracket
310: light module
320: Frame
330: arm
340: bracket Different types of aircraft are made for different purposes. Moreover, the same aircraft is customized for different purposes and operations. For example, helicopters are equipped differently related to their missions, some have only the basic statutory lighting requirements for anti-collision and navigation while others add searchlights, hover lights, and/or hoist lights, etc. Like any other aircraft, helicopters are costly. Thus, the same helicopters are used for different operations. For example, Police helicopters are also used for different missions of SWAT, public disturbance, accidents, crime chases, etc. The helicopters must be equipped with all the required lights for different operations which becomes costly and require wiring all over the airframe, and there are also high certification costs.

Moreover, existing light systems lack intensity, dual-mode Night Vision Imaging System (NVIS) compatible illumination, distances/beam patterns and widths, and combination collaboration with other lights.

Figure 10:
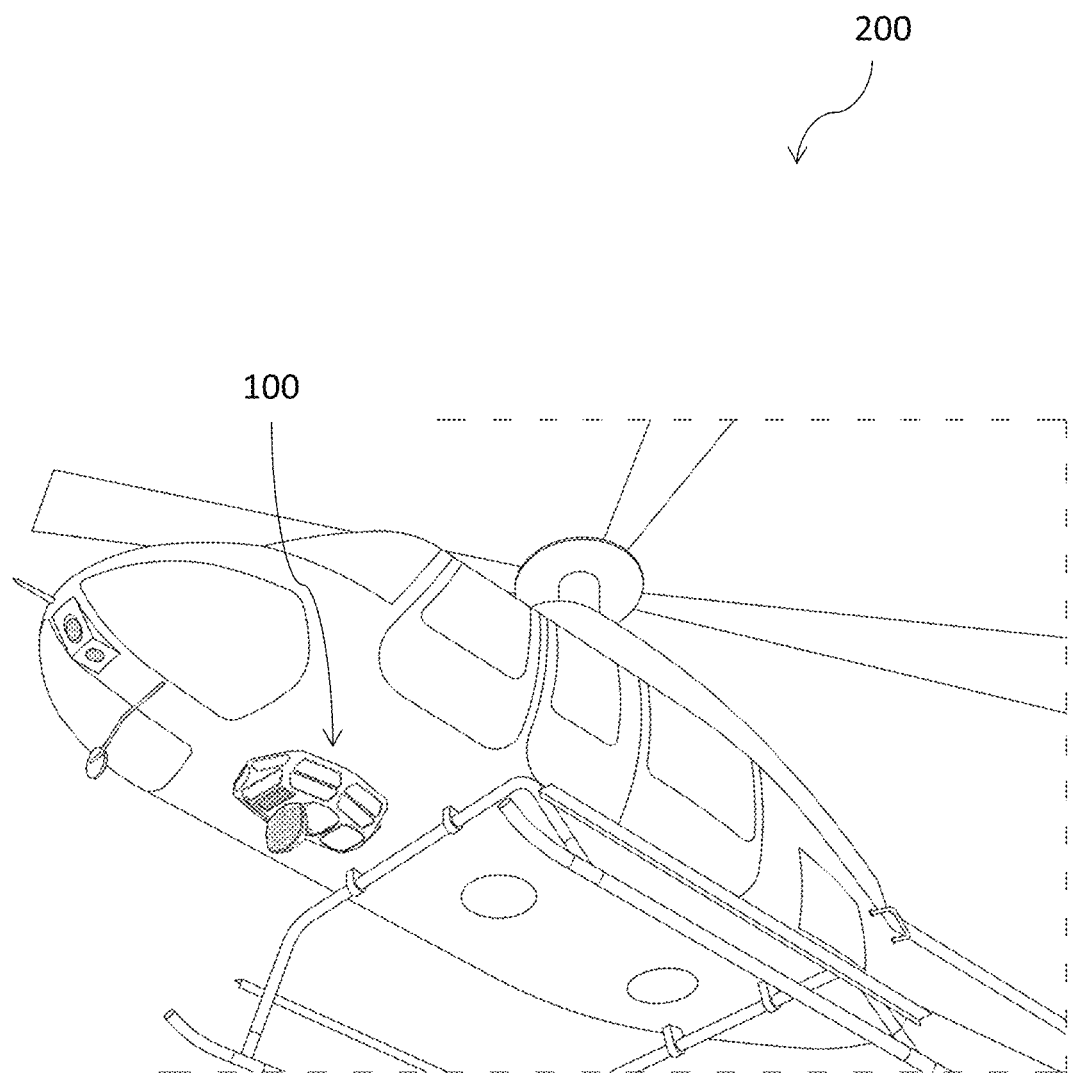
FIG. 10 shows the lighting pod mounted to the belly of a helicopter, according to an exemplary embodiment of the present invention.
Figure 11:
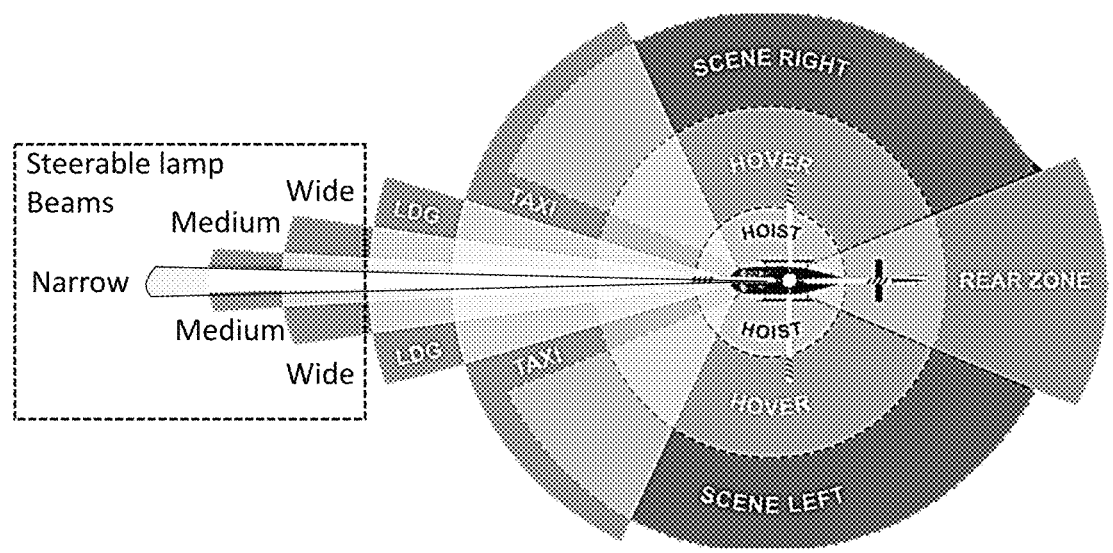
FIG. 11 shows the lighting zones of the lighting pod, according to an exemplary embodiment of the present invention.

The lighting pod, according to the present invention, includes a novel housing that allows the incorporation of different lights. FIGS. 1-8 shows different views of the lighting pod 100 according to the present invention. The lighting pod can include most of the lights required for different operations of an aircraft, such as a helicopter. The shape of the housing allows the lighting pod to incorporate lights in the most optimum position on a helicopter. FIG. 10 shows the lighting pod 100 mounted to a helicopter 200. As shown in the drawing, the lighting pod can be mounted under the belly of the helicopter. This reduces the wiring area for lights in the helicopter significantly. FIG. 11 shows different lighting zones created by the disclosed lighting pod 100, this covers almost all essential lighting needs for a helicopter or similar aircraft. Moreover, the positioning of the lights in the lighting pod 100 allows achieving wider light zones. The aerodynamic shape of the lighting pod 100 offers less drag compared to conventional multiple lights.

The Lighting Pod 100 may include a quick-mount bracket 220 that allows quick, easy, and seamless installation and removal of the lighting pod from the helicopter. All the wirings of the lights are encased within the housing 110 of the lighting pod 100 and a single electrical interface can connect the lighting pod to the helicopter electrical system easily and quickly. It is to be understood that the electrical interface may include multiple units. The unique shape of the housing offers minimum air drag while allowing the use of a combination of lights in a more efficient and synchronized manner improving overall efficiency.

The compact and all-inclusive design of the lighting pod minimizes wiring all over the aircraft which adds significant weight, while it is intended for helicopters to have a limited payload due to their inefficiency in flight. The optimum arrangement of the lights in the housing and positioning underneath the helicopter avionics bay provide unobstructed lighting to the ground which is an unparalleled advantage.

The lighting pod may also include one or more cameras, LIDARs, and/or radars to provide unmatched visibility without adding significant weight and wiring complexity. The housing may also protect the encased cameras and other sensors.

Referring to FIG. 11 which shows the different lighting zones created by the disclosed lighting pod. Scene lighting can be provided on both sides, hover lighting for hovering and landing, hoist lighting for helicopters doing hoist rescue or delivery of items, and of course inflight searchlight functions of different distances and beams plus landing and taxi. All in one shared housing and electronics system directly mounted below the avionics bay of the helicopters on the centerline, so low weight and perfect flight balance can be achieved with the disclosed lighting pod.

The housing as shown in the drawings is of an aerodynamic shape that offers minimum air drag. Such a design is critical as it must be strong to withstand G-forces of flights and landings, and the severe vibration of a helicopter in flight. Traditional lights on a helicopter cause dramatic parasitic drag and off-centerline weight which means the airframe is flying out of balance with the pressure being felt in the controls by the pilot. The disclosed lighting pod can provide minimum drag by incorporating the lights in aerodynamic housing.

The weight of all the lights is along the centerline of the aircraft, which provides greater stability, superior lighting, and imagery pathways from its belly mount, as shown in FIG. 10.

Figure 2:
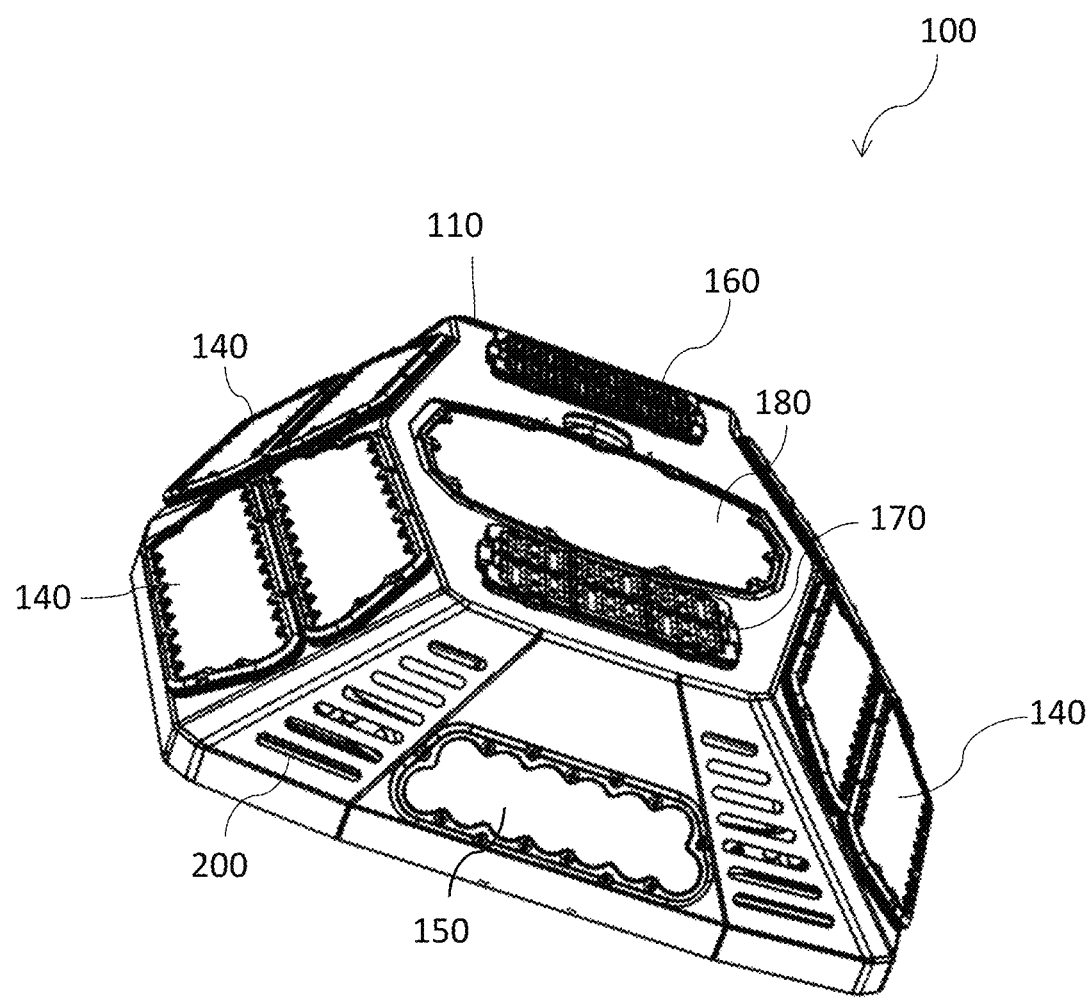
FIG. 2 shows another perspective view of the lighting pod for the aircraft, according to an exemplary embodiment of the present invention.
Figure 3:
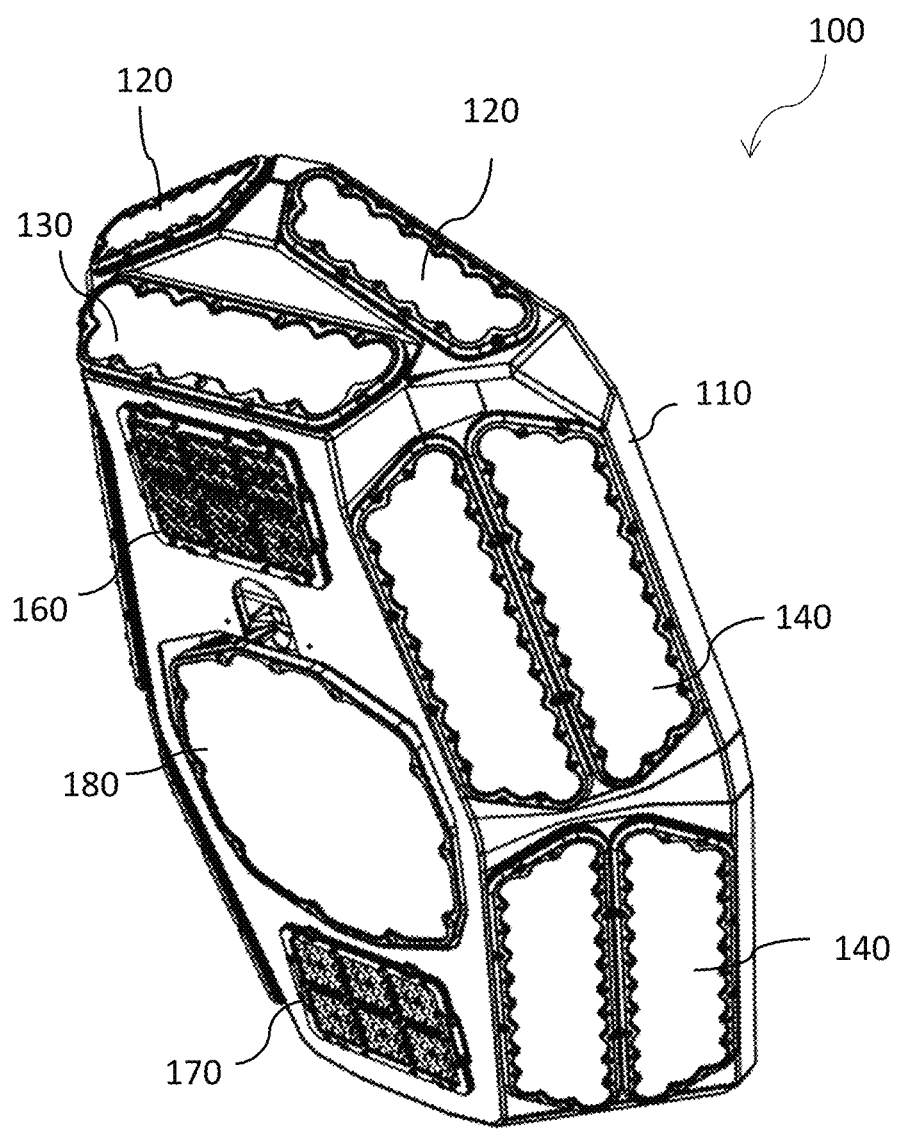
FIG. 3 shows another perspective view of the lighting pod for aircraft, according to an exemplary embodiment of the present invention.
Figure 4:
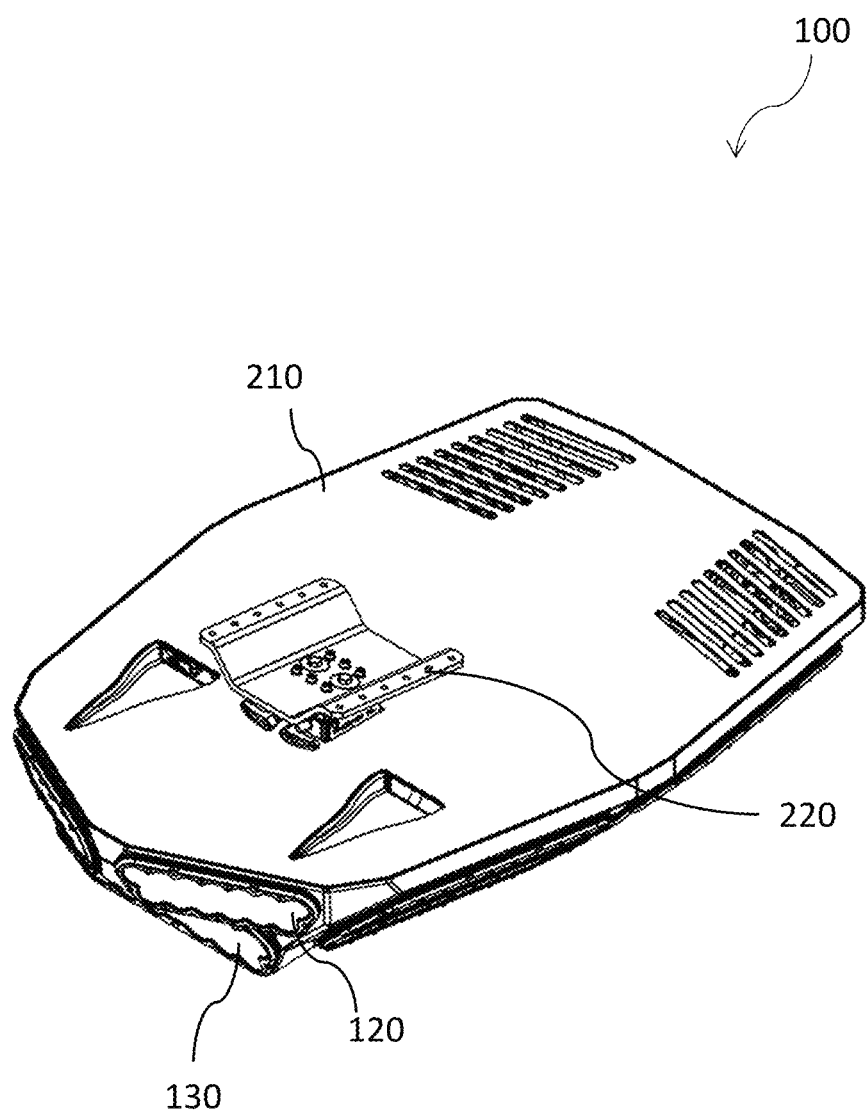
FIG. 4 shows another perspective view of the lighting pod for aircraft, according to an exemplary embodiment of the present invention.
Figure 5:
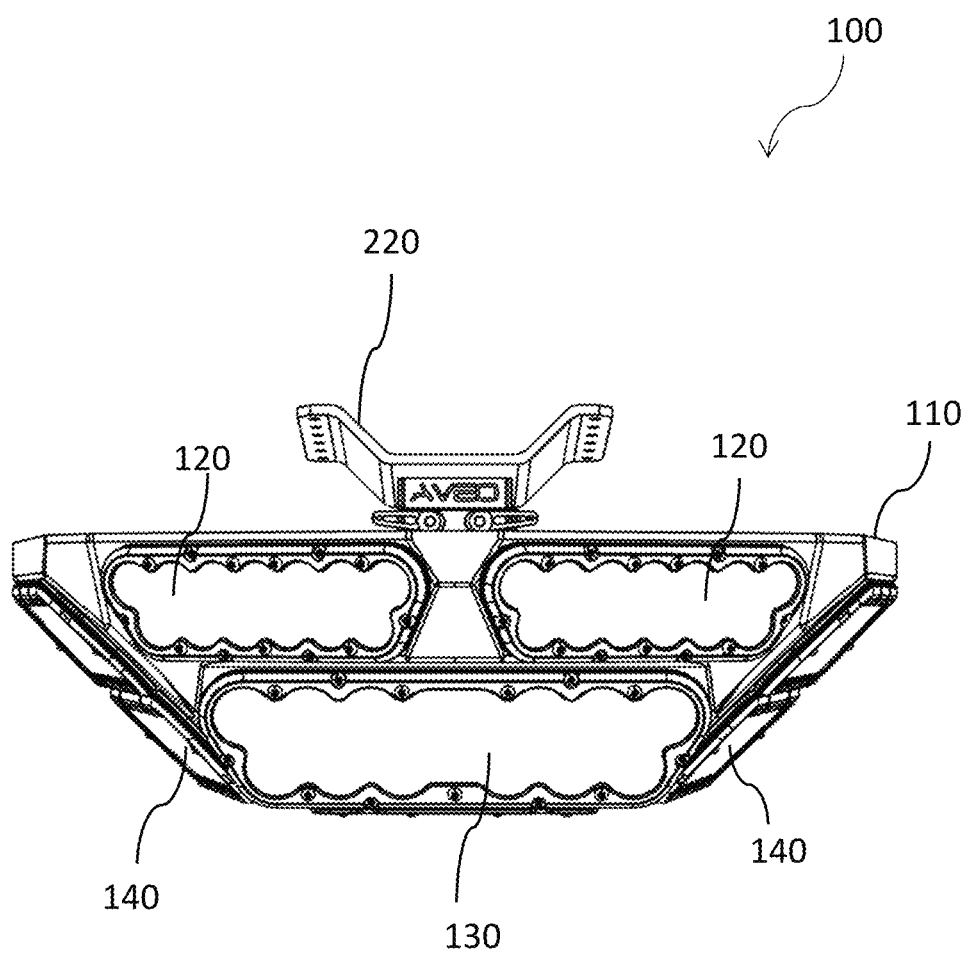
FIG. 5 shows a front view of the lighting pod for aircraft, according to an exemplary embodiment of the present invention.
Figure 6:
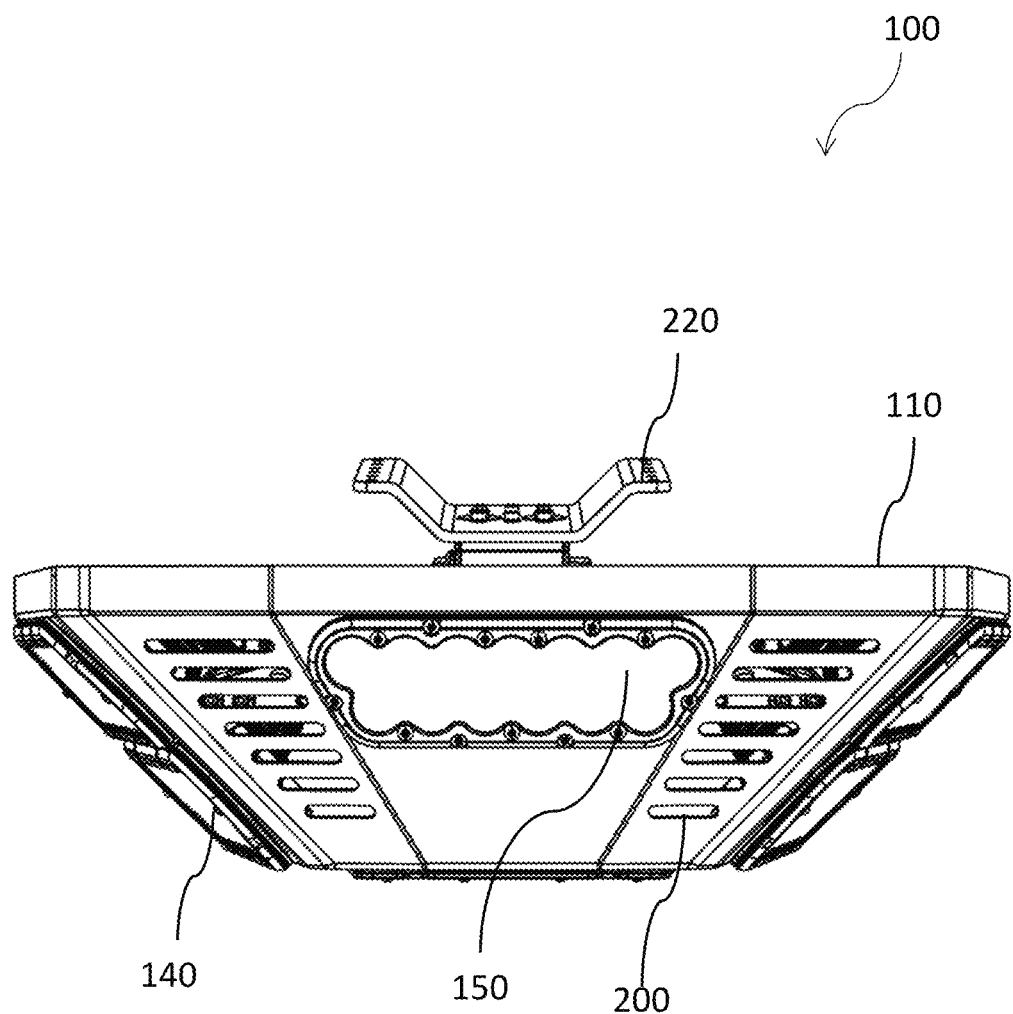
FIG. 6 shows a rear view of the lighting pod for aircraft, according to an exemplary embodiment of the present invention.
Figure 7:
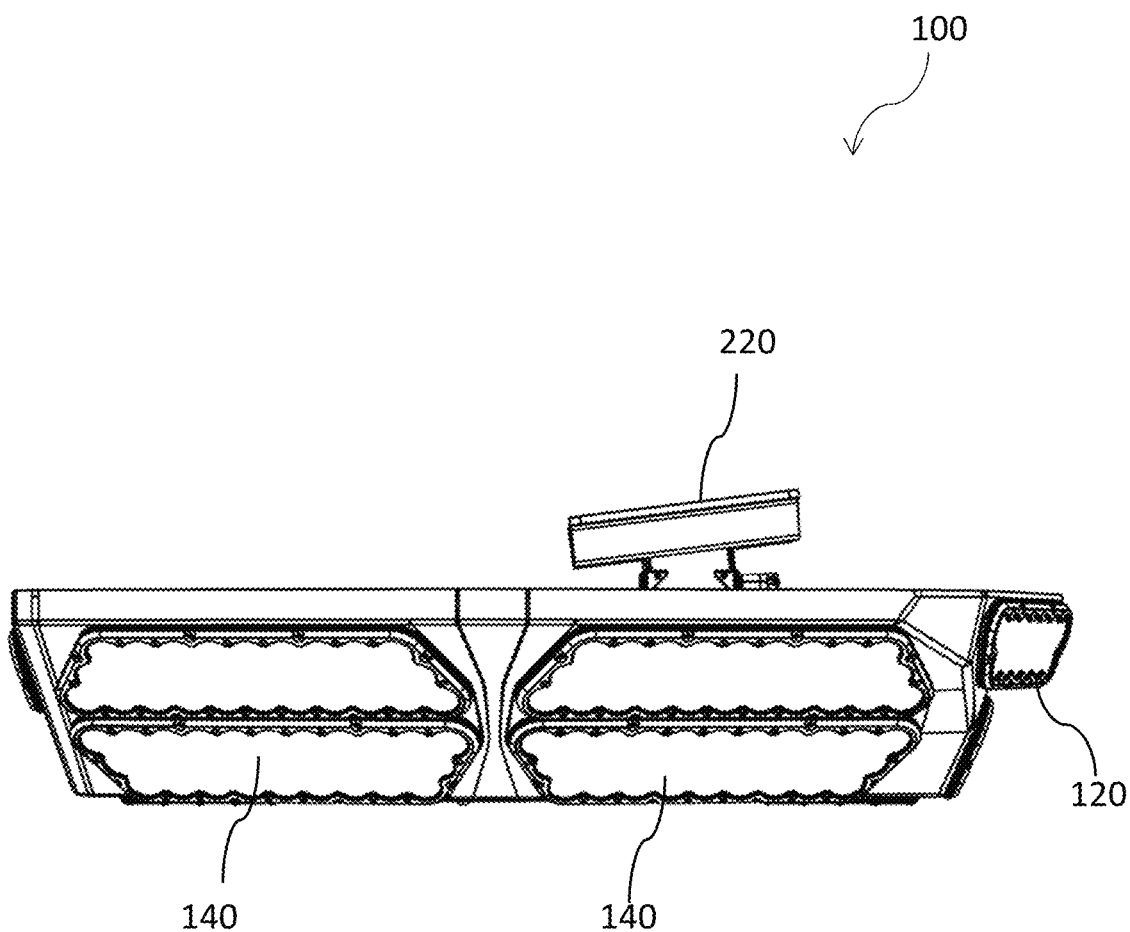
FIG. 7 shows a side view of the lighting pod for aircraft, according to an exemplary embodiment of the present invention.
Figure 8:
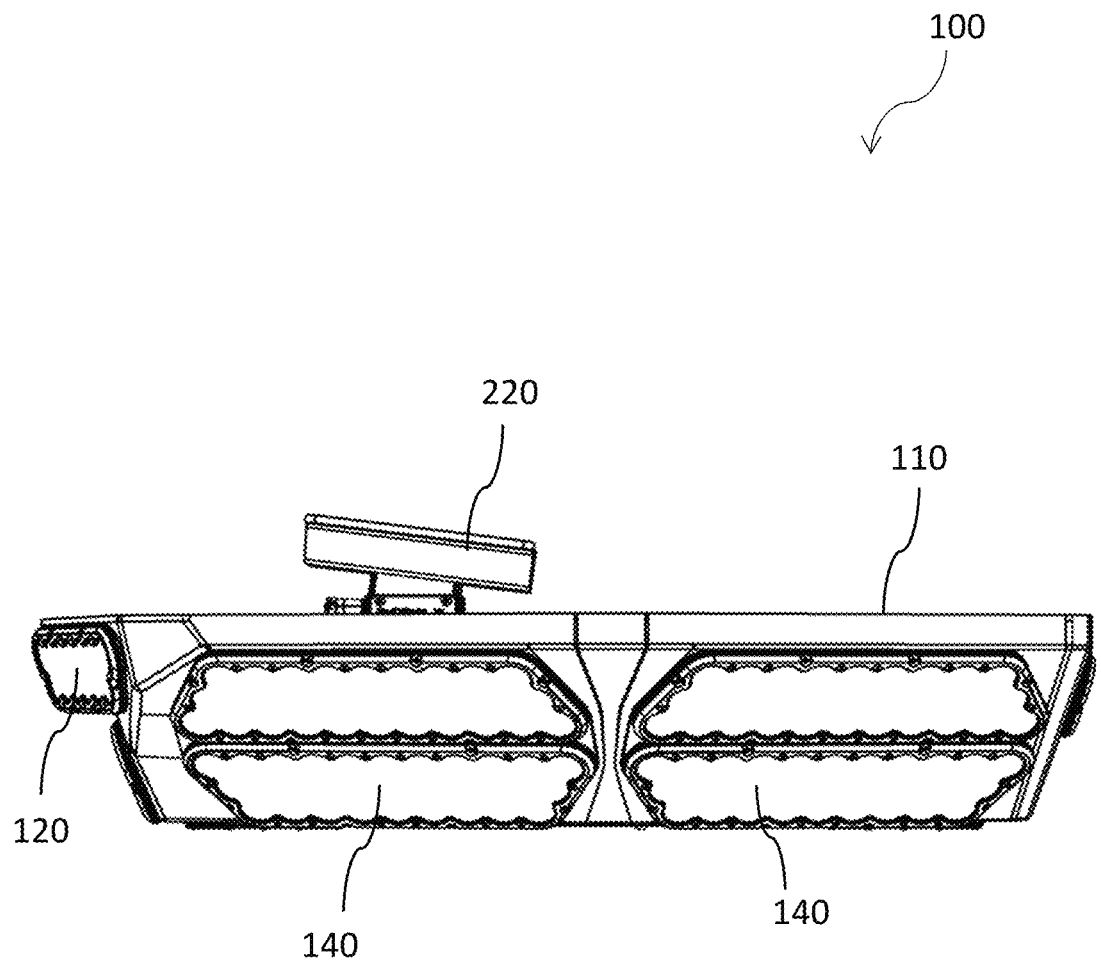
FIG. 8 shows another side view of the lighting pod for aircraft, according to an exemplary embodiment of the present invention.
Figure 9:
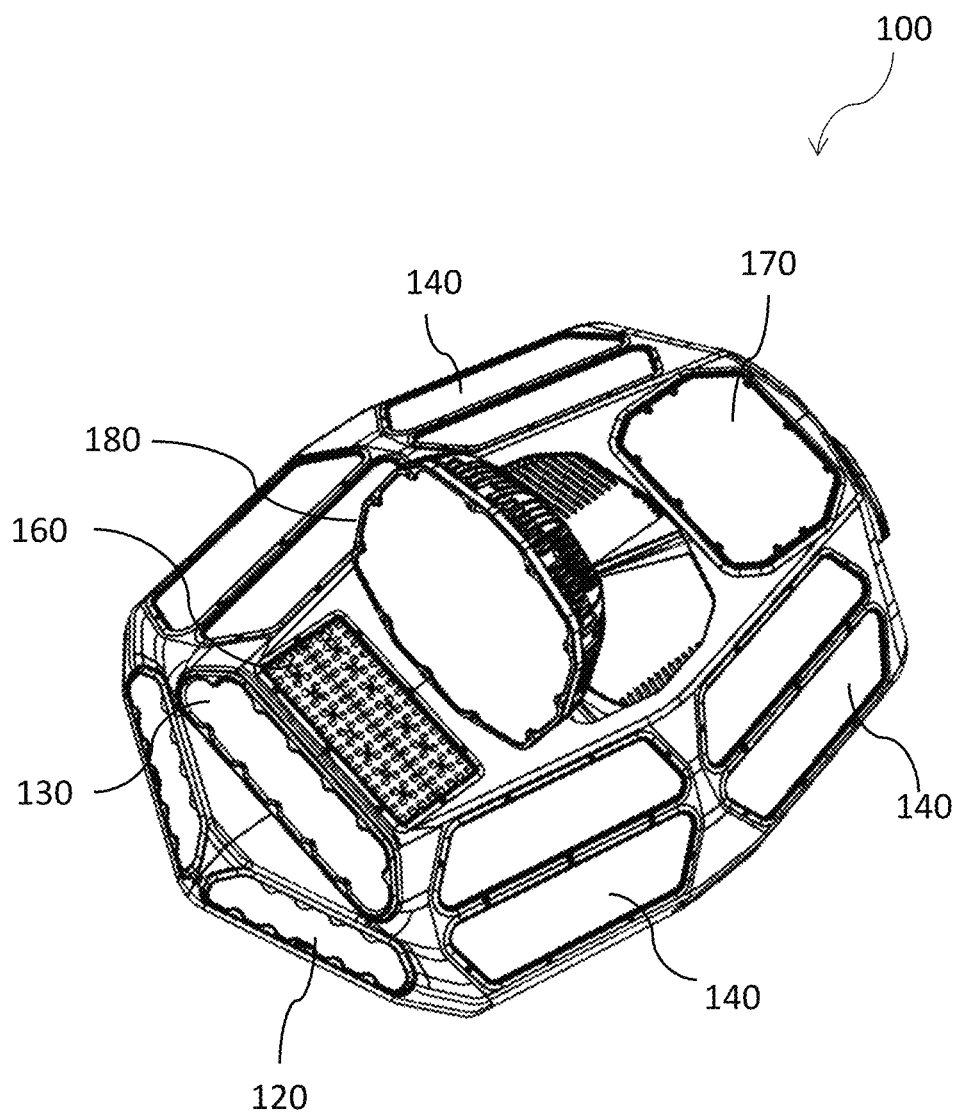
FIG. 9 shows the lighting pod having the headlight in a use state, according to an exemplary embodiment of the present invention.

As shown in FIGS. 1 and 2, the housing includes a front and a rear. The front of the housing has a nose and a head. The nose is at the bottom side while the head is above the nose, and a step is formed between the head and the nose. This allows the front of the lighting pod to be aerodynamic, offering very less drag and efficient lighting. The nose is formed by two diagonal flat sides intersecting at an acute angle while the head is flat. As seen from the top, the step is substantially triangular.

The left of the housing includes two diagonal sides. Similarly, the right of the housing includes two diagonal sides. Each diagonal side on the left and right of the housing may be flat and have an upper portion and a lower portion. OR each diagonal side on the left and right of the housing may include an upper portion and a lower portion that are flat and intersect at an acute angle. Also, as shown in the drawings, the left and right diagonal sides slant inwards from the bottom to the top of the housing. The rear of the housing may be substantially flat and slant inwards from the bottom to the top of the housing.

The housing includes a base plate 210 that faces the body of the aircraft when the lighting pod is installed on the aircraft. A coupling bracket 220 is used to mount the lighting pod 100 to an aircraft. The base plate may include vents for dissipating the heat. Similar vents 200 can be provided on the rear side of the housing.

The top of the housing can be substantially flat having a front-end portion, a rear-end portion, and a middle portion. The middle portion may have a hole for a light to be stowed. Two taxi lights 120 can be installed on the left and right diagonal sides of the nose. A landing light 130 can be installed on the head at the front of the housing. On the left of the housing, four scene lights 140 can be installed. The four lights are on each of the upper and portions of the diagonal sides on the left of the housing. Similarly, the right of the housing may have four scene lights 140. A rear light 150 can be mounted on the rear of the housing. A hover light 160 can be mounted to the front-end portion of the top of the housing. A hoist light 170 can be mounted to the rear end portion of the top of the housing. A headlight can be pivotally mounted to the middle portion covering the hole in the middle portion of the housing. The headlight can be pivoted from 0 degrees to up to 90 degrees, between the retracted position and an extended portion. In the extended state, the headlight can illuminate the front of the lighting pod, and thus the aircraft, as shown in FIG. 11. The headlight can be pivoted using a motor encased within the housing. The headlight can be pivoted and used at multiple angles within the range of 0-90 degrees. Also, the headlights may work both in the extended and retracted states. Thus, when not in use, the headlight can be retracted into the hole offering minimum air drag.

The disclosed lighting pod is mounted on the centerline of the aircraft at the belly and is optimal for drag elimination. Therefore, there is no added pressure on flight controls as caused by legacy devices mounted outside on the skids with additional mounting frames causing C.G. shift and Parasitic drag as demonstrated in all CFD drag analysis scenarios.

Figure 12:
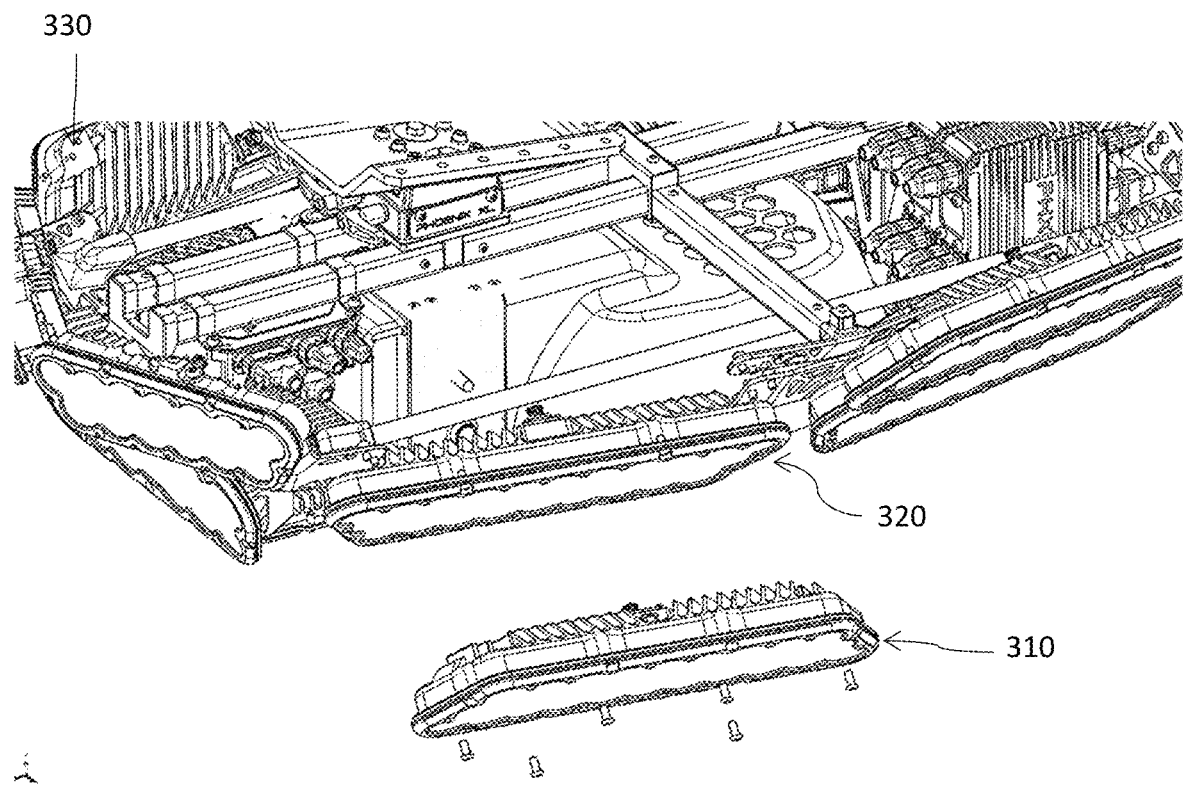
FIG. 12 shows an enlarged internal view of the lighting pod, according to an exemplary embodiment of the present invention.
Figure 13:
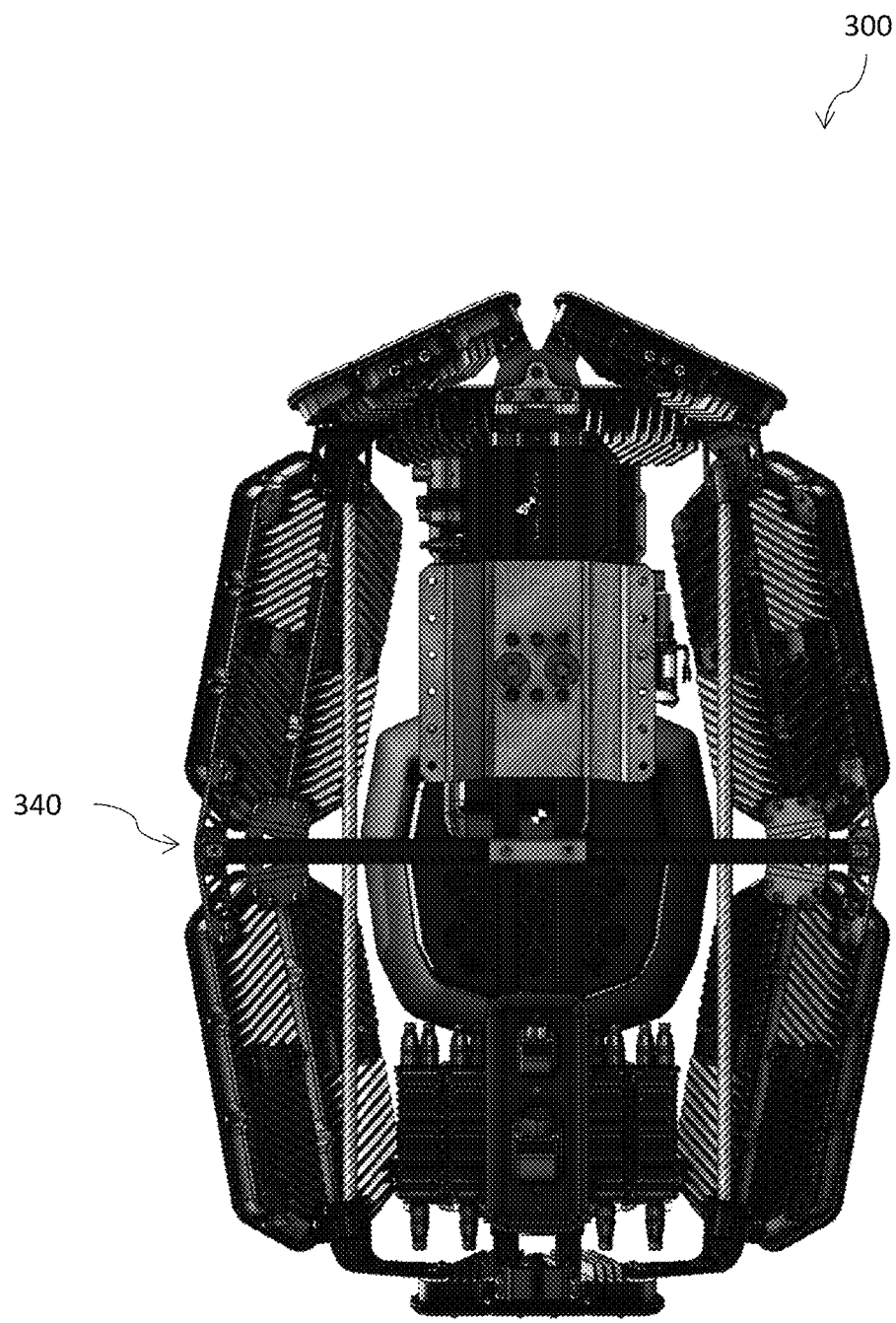
FIG. 13 shows an internal frame structure, according to an exemplary embodiment of the present invention.

Moreover, the placement of the individual lighting modules can be moved around to be optimal for a particular mission of the airframe, such as an air ambulance, SAR rescue, police, border patrol, etc. So, the lighting pod takes many custom forms using the same ingredients and uses different wavelengths of illuminators related to those missions as well. The internal frame is shown in FIGS. 12 and 13 wherein light modules 310 may be mounted into frame 320. Arm 330 may be coupled to the frame 320 allowing flexing of the frame and thus the light modules. The arms 330 coupled to the brackets 340 allows the individual lighting modules to be moved around.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A lighting pod for an aircraft comprising:
   a housing having a front, a rear, a left, a right, a top, and a bottom, wherein the bottom of the housing faces the aircraft when the lighting pod is mounted to the aircraft, the front has a nose formed by two diagonal flat sides and a head above the nose, the left has two diagonal sides, and the right has two diagonal sides, wherein different lights are mounted to the diagonal flat sides, the head, and the diagonal sides on the left and right;
   a vibration-proof and G-force absorbing coupling bracket mounted to a base plate of the housing, the base plate is at the bottom, and the coupling bracket is configured to mount the lighting pod to the aircraft; and
   an electrical interface configured for connecting the lighting pod to electronics of the aircraft.

2. The lighting pod of claim 1, wherein the aircraft is a helicopter, and the lighting pod is configured to mount over a belly of the helicopter.

3. The lighting pod of claim 1, wherein two taxi lights are mounted to the two diagonal flat sides of the nose.

4. The lighting pod of claim 3, wherein a landing light is mounted to the head.

5. The lighting pod of claim 4, wherein four scene lights are mounted to the two diagonal sides of the left of the housing, two scene lights one above another on each of the two diagonal sides of the left of the housing.

6. The lighting pod of claim 5, wherein four scene lights are mounted to the two diagonal sides of the right of the housing, two scene lights one above another on each of the two diagonal sides of the right of the housing.

7. The lighting pod of claim 6, wherein a rear light is mounted on the rear of the housing.

8. The lighting pod of claim 7, wherein the top of the housing has a front-end portion, a rear-end portion, and a middle portion, the middle portion has a hole.

9. The lighting pod of claim 8, wherein a hover light is mounted on the front-end portion of the top of the housing.

10. The lighting pod of claim 9, wherein a hoist light is mounted on the rear-end portion of the top of the housing.

11. The lighting pod of claim 8, wherein a headlight is mounted on the middle portion covering the hole, wherein the headlight is configured to pivot between a retracted state and an extended state.

\* \* \* \* \*